(12) United States Patent
Taffe (10) Patent No.: US 12,086,183 B2
(45) Date of Patent: Sep. 10, 2024

(54) GRAPH DATA STRUCTURE EDGE PROFILING IN MAPREDUCE COMPUTATIONAL FRAMEWORK

(71) Applicant: LiveRamp, Inc., San Francisco, CA (US)

(72) Inventor: Connor Taffe, Little Rock, AR (US)

(73) Assignee: LiveRamp, Inc., San Francisco, CA (US)

( * ) Notice: Subject to any disclaimer, the term of this patent is extended or adjusted under 35 U.S.C. 154(b) by 0 days.

(21) Appl. No.: 18/008,401

(22) PCT Filed: May 28, 2021

(86) PCT No.: PCT/US2021/034710
§ 371 (c)(1),
(2) Date: Dec. 5, 2022

(87) PCT Pub. No.: WO2021/252203
PCT Pub. Date: Dec. 16, 2021

(65) Prior Publication Data
US 2023/0244719 A1    Aug. 3, 2023

Related U.S. Application Data

(60) Provisional application No. 63/036,755, filed on Jun. 9, 2020.

(51) Int. Cl.
*G06F 16/00* (2019.01)
*G06F 16/901* (2019.01)

(52) U.S. Cl.
CPC ................ *G06F 16/9024* (2019.01)

(58) Field of Classification Search
CPC .................................................. G06F 16/9024
See application file for complete search history.

(56) References Cited

U.S. PATENT DOCUMENTS

| | | | |
|---|---|---|---|
| 8,185,558 B1* | 5/2012 | Narayanan | G06F 3/04842 707/798 |
| 2008/0098375 A1* | 4/2008 | Isard | G06F 11/1438 717/149 |
| 2011/0238607 A1* | 9/2011 | Coury | G06T 11/206 706/46 |
| 2012/0309539 A1* | 12/2012 | Smith | A63F 13/795 463/42 |
| 2014/0136468 A1* | 5/2014 | Faratin | G06N 5/025 706/55 |
| 2015/0370838 A1* | 12/2015 | Paradies | G06F 16/9024 707/738 |
| 2020/0169565 A1* | 5/2020 | Badawy | G06F 21/552 |
| 2020/0244537 A1* | 7/2020 | Hagy | H04L 67/56 |
| 2020/0265090 A1* | 8/2020 | Hilloulin | G06F 16/9024 |

* cited by examiner

*Primary Examiner* — Syed H Hasan (57) ABSTRACT

A method for edge profiling within a data graph measures the impact that a particular type of edge has on a data graph. A list of all edges contained within a single connected component within the graph is generated in order to search for bridges across connected subcomponents. The process is implemented as two MapReduce jobs on separate compute clusters. The first job is the edge profile job, which is implemented as a Map-only job. The second job reads the output of the first, and builds multiple in-memory data structures representing each connected component within the data graph. After the graph is created, it is traversed to find bridges.

15 Claims, 5 Drawing Sheets

GRAPH DATA STRUCTURE EDGE PROFILING IN MAPREDUCE COMPUTATIONAL FRAMEWORK

CROSS REFERENCE TO RELATED APPLICATIONS

This application claims the benefit of U.S. provisional patent application No. 63/036,755, filed on Jun. 9, 2020. Such application is incorporated by reference as if set forth herein in its entirety.

BACKGROUND OF THE INVENTION

Data concerning objects may be stored in a graph data structure or data graph. In a data graph, the nodes of the graph are the data elements and the edges are the relationships between the data elements. An identity graph is a special type of data graph used to store and utilize data pertaining to natural persons, households of natural persons, or businesses. Data graphs may, however, be used to store information about any type of object. The edges in a data graph are used to link together data pertaining to the same object. The nodes may include various data that are associated with the same object, such as, in the case of an identity graph, a name, address, email address, telephone number, and the like. There also may be "primary" nodes for natural persons or businesses, which link to each associated touchpoint, as well as household nodes associated with persons who share a household. By using the data structure of a data graph, all data related to the same object may be easily identified by following the edges connecting the associated nodes. This structure thus enables a comprehensive understanding of each object for which data is maintained, in a way that makes that data easily and quickly accessible.

In a typical commercial identity graph maintained by a commercial data services provider, a substantial quantity of the data contained within the graph is purchased or contracted for from a large number of data vendors. The provider must carefully consider whether to include new data in its identity graph, since inaccurate data may actually lower rather than raise the defensibility of the data within the identity graph even though the quantity of data in the graph has increased. Thus, the trustworthiness or believability of new candidate data sources that are considered for addition to the data graph is critical, but often very difficult to determine beforehand. Historically, this is determined based largely on the trustworthiness of the source itself, not by analyzing the actual data to be added. The expected impact of the addition of this new data to the effective reach and defensibility of the truth of the data in the resulting data graph would ideally be known before the data is added.

Presently, data vendors often provide a sample of their data for evaluation in order to estimate the impact of data on a graph. But this data is typically the data vendor's most highly curated records, and thus is not truly representative of the entire data set. Data vendors rarely will provide their full data set for evaluation before purchase, and aren't likely to provide lower quality data in a sample. This problem makes the extrapolation of the analysis of the highly curated sample to the full data set questionable, unless there is additional evidence available that the sample behaves in a manner similar to that of a random sampling of the data vendor's data that is being offered. A related problem is to efficiently determine the impact of existing data sources already in the data graph, with respect to the effective reach and contribution to defensible decisions within the overall entity resolution system. The cost of an additional data source may not be warranted if it does not provide significant additional reach based on the data already stored in the data graph; this may occur, for example, when there is substantial overlap between the high-quality data in the additional data source and the data already present in the graph.

It would be desirable to develop a system and method for assessing the value that a particular data type or data source has on a data graph, including without limitation an identity graph. Further, given the fact that data graphs may include billions of nodes and trillions of edges, the solution would need to be computationally feasible within a reasonable timeframe for a business.

References mentioned in this background section are not admitted to be prior art with respect to the present invention.

SUMMARY OF THE INVENTION

The present invention is directed to a system and method for edge "profiling" within a data graph. Profiling involves the determination of the impact that a particular type of edge has on a data graph. In certain implementations, the present invention produces a list of all edges contained within a single connected component within the graph, and then allows analysis in order to detect bridges across connected subcomponents. In order to make the process computationally feasible in an environment with trillions of edges, such as is typical in large commercial data graphs, the invention may in certain cases be implemented as two MapReduce jobs on separate compute clusters. The first job is the edge profile job, which is implemented as a Map-only job. The second job reads the output of the first, and builds multiple in-memory data structures representing each connected component within the data graph. After the graph is created, it is traversed to find bridges, i.e., edges that are the only connection between nodes or groups of nodes, that is, connected subcomponents. A bridge indicates that this edge is the only edge providing a connection between the connected subcomponents, the removal of which means that there will no longer be a connection between the connected subcomponents at all.

These and other features, objects and advantages of the present invention will become better understood from a consideration of the following detailed description of the preferred embodiments in conjunction with the drawings and appended claims.

DETAILED DESCRIPTION

Before the present invention is described in further detail, it should be understood that the invention is not limited to the particular embodiments described, and that the terms used in describing the particular embodiments are for the purpose of describing those particular embodiments only, and are not intended to be limiting, since the scope of the present invention will be limited only by the claims.

One implementation of the present invention may be described with reference to FIG. 1. The solution is implemented by two Hadoop MapReduce jobs (edge profiling 14 and bridge finding 16) on separate big data processing framework clusters. For example, the solution may be implemented on Google Cloud Dataproc Hadoop Clusters. Apache Hadoop is a collection of open-source software utilities that facilitate the use of a networked group of computers, as within the cloud, in order to solve problems involving massive quantities of data. It works with the MapReduce model, which is a processing technique for distributed computing based on the Java programming language. The MapReduce algorithm contains two different potential tasks, the Map task and the Reduce task. Map is a filtering and sorting procedure, which takes a set of data and converts it into another set of data, where individual elements are broken down into tuples (i.e., key/value pairs). Reduce performs a summary operation on these tuples. The Google Cloud Dataproc is a managed Hadoop service that allows cloud computing users to take advantage of a variety of data tools for batch processing, querying, streaming, and machine learning in a cluster computing environment. It provides custom virtual machine building, autoscaling to meet performance requirements, and automatically powers down unneeded resources.

Figure 1:
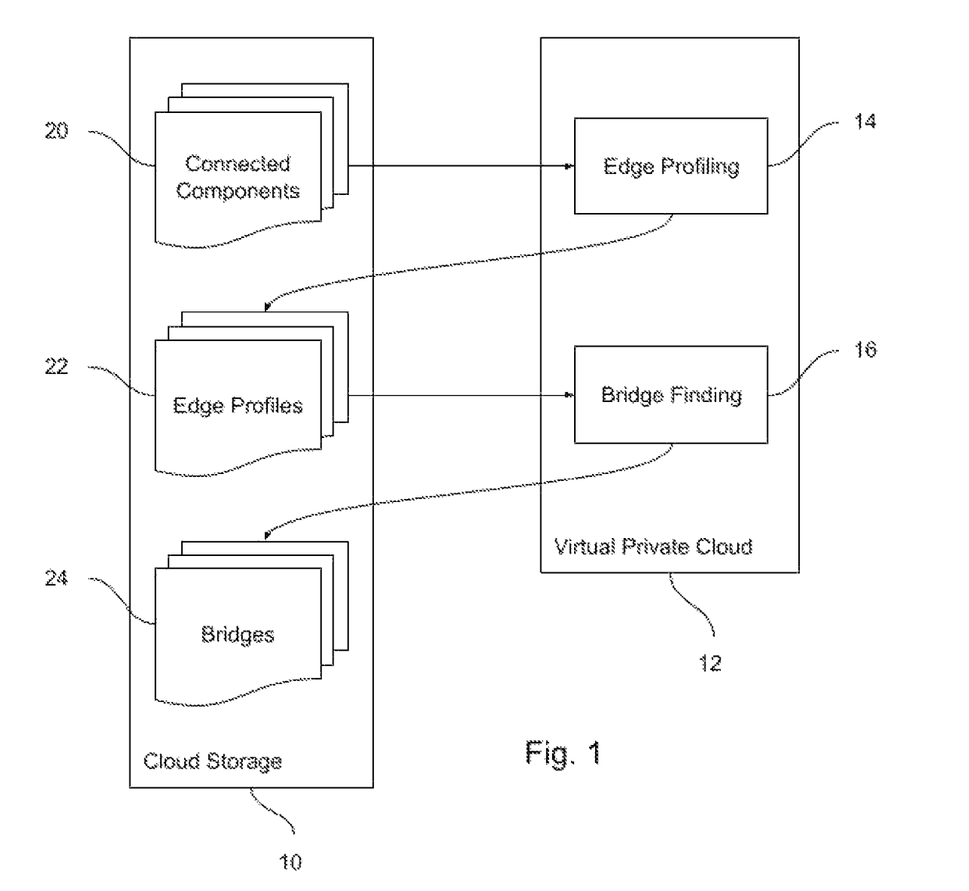
FIG. 1 is a flow diagram for a process according to an embodiment of the present invention.

To begin the process illustrated in FIG. 1, the input to edge profiling job 14 in certain implementations is the list of connected components 20, which are delimited nodes keyed by a group identifier. Connected components 20 are sets of connected nodes formed by following all connecting edges. In certain cases these nodes don't connect via all edges, such that some business intelligence may be used to cut edges which bring too many nodes together. The process is implemented using a big data processing framework that does not rely on sorting or shuffling data, such as a Hadoop Map-only job, and the implementation of edge profiling 14 analyzes each group independently to find the edges which connect each entity to other entities within connected components 20. It uses a key/value store where the key is an edge type and the value is an edge value, and another data store where the key is an edge value and the value is a set of entity identifiers. This edge profiles 22 data structure is stored in memory in each concurrently executed task at cloud storage 10. For each entity processed within a group, each edge value in the entity row is looked up in the data structure by type. In the example where the objects are persons, households, or businesses, then various links may be used to unambiguously link data pertaining to each object. Thus, for example, a look-up may be performed by address link (a unique identifier for a particular address) and then by value. The entity identifier is then appended to a unique collection of identifiers. Once an entire group has been processed, the concurrently executed task outputs a nested delimited format first divided by edge type, then by edge value, and then the list of every entity identifier which that value was found in and the sources which provided that entity identifier (entity ID).

Next, a second MapReduce job reads the output of the first, and builds multiple in-memory data structures representing each connected component within the data graph. The edge profiles 22 are used to build a data store of edge type and value to entity IDs, and a data store of entity ID to edge type and value. For each value list in the latter, each entity ID is looked up in the former data store, resulting in many entity ID pairs, which are ordered deterministically and stored in the data store to avoid duplicate edges. This last data store forms the graph. To determine the impact of removing an edge, that edge is ignored when creating the entity ID to entity ID graph from the two data stores.

After the graph is created, it is traversed with Breadth First Search (BFS) to find bridges at bridge finding 16. BFS is a search algorithm for traversing or searching tree or graph data structures that starts at the root, and then explores all of the neighbor nodes at the present depth before moving on to the nodes at the next depth level. BFS traverses the connected graph using edge profiles 22, and any disconnected part will be unreachable. BFS generates a list of seen entity IDs, which is compared to the complete list of entity IDs in edge profiles 22. If they aren't the same set, then the removed edge was a bridge, meaning that two components within the original connected component were solely connected by it. The resulting output is written to bridges 24 in cloud storage 10.

In the example of FIG. 1, two Hadoop MapReduce jobs are run on large Google Dataproc (managed Hadoop cluster service) clusters in a shared VPC (Virtual Private Cloud) network. Both Dataproc clusters run on "n1-standard-32" type instances, which each have 32 virtual CPUs (i.e., one hyperthread on an available hardware platform, in this case an Intel Xeon Scalable Processor (Skylake)) and 120 GB of RAM. The edge profiling 14 cluster runs on 100 nodes, each with a 512 GB "pd-standard" disk. It is a map-only job, meaning it skips the expensive Hadoop MapReduce "shuffle" stage to save cost and avoid additional storage and network transfer, and instead reads and writes to GCS (Google Cloud Storage) directly via the network. It writes its output, several TBs of plain text in a custom delimited format described above. The bridge finding 16 cluster runs on 512 nodes, with a 128 GB disk. It is also a map-only job. The output, bridges 24, is stored in Avro, which is an open source binary data serialization format.

Figure 2:
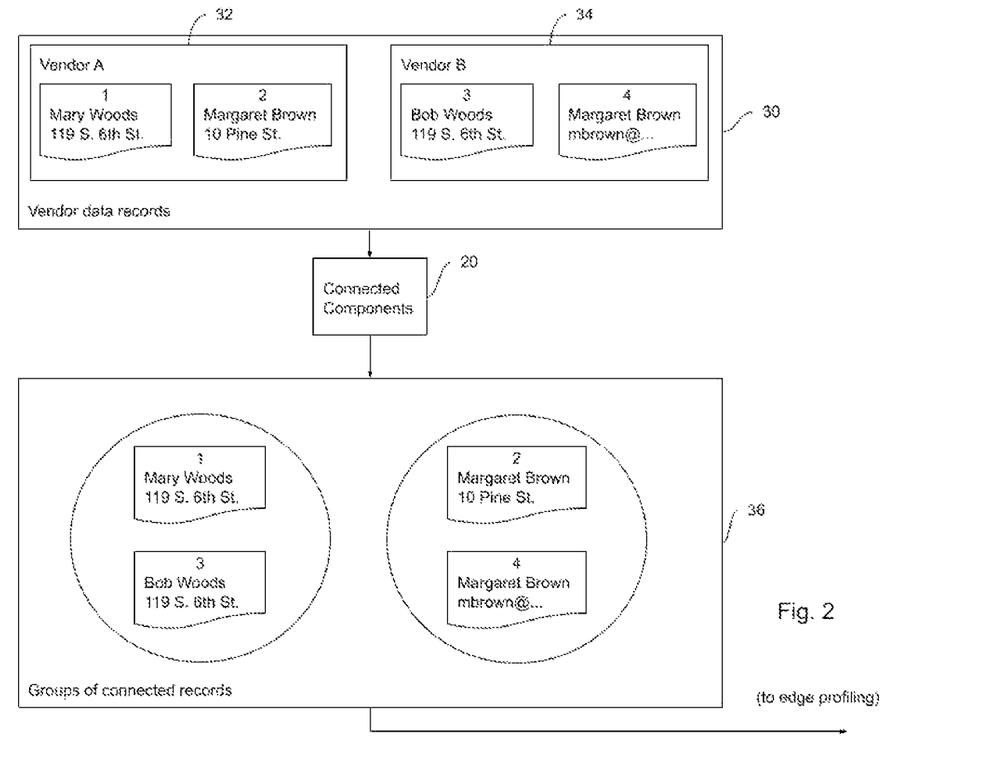
FIG. 2 illustrates an example of a connected components process according to an embodiment of the present invention.
Figure 3:
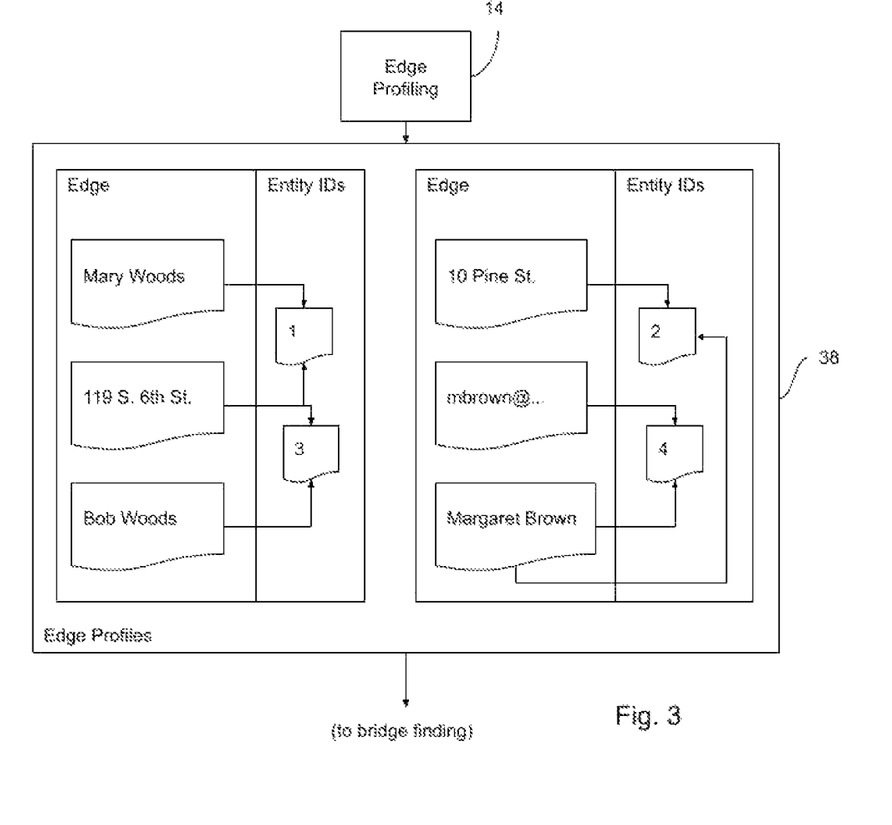
FIG. 3 illustrates an example of an edge profiling process according to an embodiment of the present invention.

FIGS. 2 and 3 illustrate the inputs and outputs of each stage in a simplified exemplary implementation of the invention dealing with an identity graph. Beginning in FIG. 2 for this example, an identity graph is supplied with two sets of records each by two vendors A and B. The graph is constructed by applying a connected components algorithm to generate two groups of connected entities at connected components 20. Specifically, it may be seen that vendor data records 30 are composed of vendor A records 32 and vendor B records 34. Vendor A records 32 contain a record with ID #1 for Mary Woods and an associated address, and a record with ID #2 for Margaret Brown and an address. Vendor B records 34 contain a record with ID #3 for Bob Woods and an associated address (the same address as for Mary Woods, ID #1), as well as a record with ID #4 for Margaret Brown (the same person as ID #2 from Vendor A) and an email address.

The information is sorted based on which record each edge is present in; for an identity graph, this information may include name, address, and email address. These results in connected records set 36. The connections create two connected groups (shown by circles). The first connected groups contain Mary and Bob Woods, because they share an address. The second connected group contains the two records for Margaret Brown, the same person but now the process has connected this person's street address and email address.

Moving to FIG. 3 now to continue the process, edge profiling process 14 is then applied as described earlier, resulting in edge profiles 38. As may be seen in FIG. 3, there are now mappings of edges to entity IDs as key, value pairs. Each of the names "Mary Woods" and "Bob Woods" are mapped to a single ID, being ID #1 and #3, respectively. On the other hand, the address for these persons is mapped to both of these IDs. The name "Margaret Brown" is mapped to both ID #2 and #4, whereas Margaret Brown's street address is mapped only to ID #2 and her email address is mapped only to ID #4.

Figure 4:
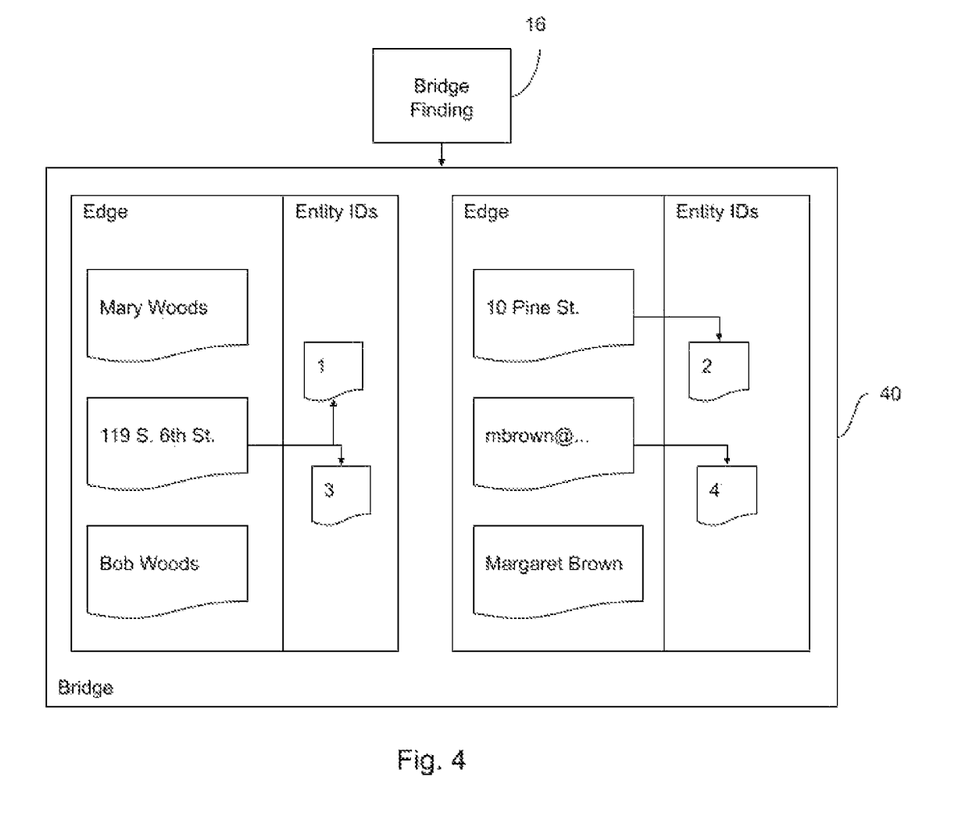
FIG. 4 illustrates an example of a bridge finding process according to an embodiment of the present invention.

Moving now to FIG. 4, bridge finding process 16 is applied. The edge profiles from edge profiles 38 are analyzed at bridge block 40 to identify groups that are bridged by edges of one kind. In this example name edges are removed and the group to the right is broken. Specifically, "Mary Woods" and "Bob Woods" on the left have their edges removed, so that only the connection between their common address and the associated IDs #1 and #3 remain, and on the right only the connections between the street address to its ID #2 and the email address to its ID #4 remain. From this result, bridges 24 may be written to cloud storage 10.

Figure 5:
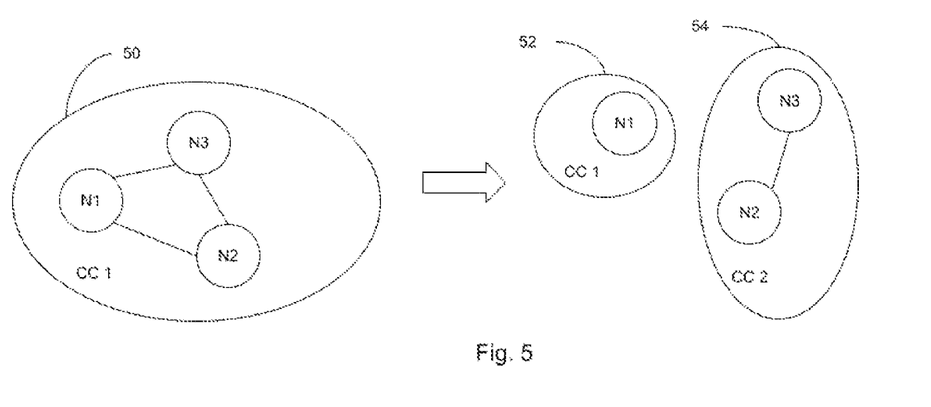
FIG. 5 illustrates a set of graph relationships according to an embodiment of the present invention.

FIG. 5 illustrates more abstractly the results that may be achieved by identifying bridges within a data graph. In the example, the original data graph 50 on the left includes a single cluster CC1. There are three edges in this simplistic case connecting three nodes N1, N2, and N3, each node being connected by two of the edges. In this case, the edge connecting N2 to N3 is of a different type than the edges connecting N1 to N3 and N1 to N2. This latter type of edge was removed to determine the impact on the connected component, which generates the reduced data graph 52 and the new data graph 54. The circles are used to show what are now two separate structures, CC1 and a new structure CC2, the only remaining edge being the one between N2 and N3. For example, in the case of an identity graph concerning persons, the impact may be to determine whether removal of the edge would create more distinct persons where before the graph believed that the corresponding data related to a single person. Traversing the graph using BFS without the removed edge type, it is found that this edge type was indeed a bridge because its removal resulted in two different connected components, CC1 and CC2.

Although the implementations described above provide specific hardware and software components used to implement the invention in such implementations, the invention is not so limited. Although Hadoop is used for processing large amounts of data, the invention in alternative implementations could be adapted to other software frameworks. Although the Google Cloud Platform is used for creating Hadoop clusters, the invention is likewise not so limited, as any cluster of large enough size for the dataset could be used. Further, different serialization formats could be used in place of Avro and custom-delimited text format.

The systems and methods described herein may in various embodiments be implemented by any combination of hardware and software. For example, in one embodiment, the systems and methods may be implemented by a computer system or a collection of computer systems, each of which includes one or more processors executing program instructions stored on a computer-readable storage medium coupled to the processors. The program instructions may implement the functionality described herein. The various systems and displays as illustrated in the figures and described herein represent example implementations. The order of any method may be changed, and various elements may be added, modified, or omitted.

A computing system or computing device as described herein may implement a hardware portion of a cloud computing system or non-cloud computing system, as forming parts of the various implementations of the present invention. The computer system may be any of various types of devices, including, but not limited to, a commodity server, personal computer system, desktop computer, laptop or notebook computer, mainframe computer system, handheld computer, workstation, network computer, a consumer device, application server, storage device, telephone, mobile telephone, other mobile computing device, or in general any type of computing node, compute node, compute device, and/or computing device. The computing system includes one or more processors (any of which may include multiple processing cores, which may be single or multi-threaded) coupled to a system memory via an input/output (I/O) interface. The computer system further may include a network interface coupled to the I/O interface.

In various embodiments, the computer system may be a single processor system including one processor, or a multiprocessor system including multiple processors. The processors may be any suitable processors capable of executing computing instructions. For example, in various embodiments, they may be general-purpose or embedded processors implementing any of a variety of instruction set architectures. In multiprocessor systems, each of the processors may commonly, but not necessarily, implement the same instruction set. The computer system also includes one or more network communication devices (e.g., a network interface) for communicating with other systems and/or components over a communications network, such as a local area network, wide area network, or the Internet. For example, a client application executing on the computing device may use a network interface to communicate with a server application executing on a single server or on a cluster of servers that implement one or more of the components of the systems described herein in a cloud computing or non-cloud computing environment as implemented in various subsystems. In another example, an instance of a server application executing on a computer system may use a network interface to communicate with other instances of an application that may be implemented on other computer systems.

The computing device also includes one or more persistent storage devices and/or one or more I/O devices. In various embodiments, the persistent storage devices may correspond to disk drives, tape drives, solid state memory, other mass storage devices, or any other persistent storage devices. The computer system (or a distributed application or operating system operating thereon) may store instructions and/or data in persistent storage devices, as desired, and may retrieve the stored instruction and/or data as needed. For example, in some embodiments, the computer system may implement one or more nodes of a control plane or control system, and persistent storage may include the SSDs attached to that server node. Multiple computer systems may share the same persistent storage devices or may share a pool of persistent storage devices, with the devices in the pool representing the same or different storage technologies.

The computer system includes one or more system memories that may store code/instructions and data accessible by the processor(s). The system memories may include multiple levels of memory and memory caches in a system designed to swap information in memories based on access speed, for example. The interleaving and swapping may extend to persistent storage in a virtual memory implementation. The technologies used to implement the memories may include, by way of example, static random-access memory (RAM), dynamic RAM, read-only memory (ROM), non-volatile memory, or flash-type memory. As with persistent storage, multiple computer systems may share the same system memories or may share a pool of system memories. System memory or memories may contain program instructions that are executable by the processor(s) to implement the routines described herein. In various embodiments, program instructions may be encoded in binary, Assembly language, any interpreted language such as Java, compiled languages such as C/C++, or in any combination thereof; the particular languages given here are only examples. In some embodiments, program instructions may implement multiple separate clients, server nodes, and/or other components.

In some implementations, program instructions may include instructions executable to implement an operating system (not shown), which may be any of various operating systems, such as UNIX, LINUX, Solaris™, MacOS™, or Microsoft Windows™, or mobile computing device operating systems such as iOS™. Any or all of program instructions may be provided as a computer program product, or software, that may include a non-transitory computer-readable storage medium having stored thereon instructions, which may be used to program a computer system (or other electronic devices) to perform a process according to various implementations. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to the computer system via the I/O interface. A non-transitory computer-readable storage medium may also include any volatile or non-volatile media such as RAM or ROM that may be included in some embodiments of the computer system as system memory or another type of memory. In other implementations, program instructions may be communicated using optical, acoustical or other form of propagated signal (e.g., carrier waves, infrared signals, digital signals, etc.) conveyed via a communication medium such as a network and/or a wired or wireless link, such as may be implemented via a network interface. A network interface may be used to interface with other devices, which may include other computer systems or any type of external electronic device. In general, system memory, persistent storage, and/or remote storage accessible on other devices through a network may store data blocks, replicas of data blocks, metadata associated with data blocks and/or their state, database configuration information, and/or any other information usable in implementing the routines described herein.

In certain implementations, the I/O interface may coordinate I/O traffic between processors, system memory, and any peripheral devices in the system, including through a network interface or other peripheral interfaces. In some embodiments, the I/O interface may perform any necessary protocol, timing or other data transformations to convert data signals from one component (e.g., system memory) into a format suitable for use by another component (e.g., processors). In some embodiments, the I/O interface may include support for devices attached through various types of peripheral buses, such as a variant of the Peripheral Component Interconnect (PCI) bus standard or the Universal Serial Bus (USB) standard, for example. Also, in some embodiments, some or all of the functionality of the I/O interface, such as an interface to system memory, may be incorporated directly into the processor(s).

A network interface may allow data to be exchanged between a computer system and other devices attached to a network, such as other computer systems (which may implement one or more storage system server nodes, primary nodes, read-only node nodes, and/or clients of the database systems described herein), for example. In addition, the I/O interface may allow communication between the computer system and various I/O devices and/or remote storage. Input/output devices may, in some embodiments, include one or more display terminals, keyboards, keypads, touchpads, scanning devices, voice or optical recognition devices, or any other devices suitable for entering or retrieving data by one or more computer systems. These may connect directly to a particular computer system or generally connect to multiple computer systems in a cloud computing environment, grid computing environment, or other system involving multiple computer systems. Multiple input/output devices may be present in communication with the computer system or may be distributed on various nodes of a distributed system that includes the computer system. The user interfaces described herein may be visible to a user using various types of display screens, which may include CRT displays, LCD displays, LED displays, and other display technologies. In some implementations, the inputs may be received through the displays using touchscreen technologies, and in other implementations the inputs may be received through a keyboard, mouse, touchpad, or other input technologies, or any combination of these technologies.

In some embodiments, similar input/output devices may be separate from the computer system and may interact with one or more nodes of a distributed system that includes the computer system through a wired or wireless connection, such as over a network interface. The network interface may commonly support one or more wireless networking protocols (e.g., Wi-Fi/IEEE 802.11, or another wireless networking standard). The network interface may support communication via any suitable wired or wireless general data networks, such as other types of Ethernet networks, for example. Additionally, the network interface may support communication via telecommunications/telephony networks such as analog voice networks or digital fiber communications networks, via storage area networks such as Fibre Channel SANs, or via any other suitable type of network and/or protocol.

Any of the distributed system embodiments described herein, or any of their components, may be implemented as one or more network-based services in the cloud computing environment. For example, a read-write node and/or read-only nodes within the database tier of a database system may present database services and/or other types of data storage services that employ the distributed storage systems described herein to clients as network-based services. In some embodiments, a network-based service may be implemented by a software and/or hardware system designed to support interoperable machine-to-machine interaction over a network. A web service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP). In some embodiments, network-based services may be implemented using Representational State Transfer (REST) techniques rather than message-based techniques. For example, a network-based service implemented according to a REST technique may be invoked through parameters included within an HTTP method such as PUT, GET, or DELETE.

Unless otherwise stated, all technical and scientific terms used herein have the same meaning as commonly understood by one of ordinary skill in the art to which this invention belongs. Although any methods and materials similar or equivalent to those described herein can also be used in the practice or testing of the present invention, a limited number of the exemplary methods and materials are described herein. It will be apparent to those skilled in the art that many more modifications are possible without departing from the inventive concepts herein.

All terms used herein should be interpreted in the broadest possible manner consistent with the context. When a grouping is used herein, all individual members of the group and all combinations and sub-combinations possible of the group are intended to be individually included in the disclosure. All references cited herein are hereby incorporated by reference to the extent that there is no inconsistency with the disclosure of this specification. When a range is used herein, all points within the range and all subranges within the range are intended to be included in the disclosure.

The present invention has been described with reference to certain preferred and alternative implementations that are intended to be exemplary only and not limiting to the full scope of the present invention.

The invention claimed is:

1. A method for edge profiling within a data graph in a cloud computing environment, the method comprising the steps of:
   receiving a set of connected components stored within cloud storage in the cloud computing environment, wherein each of the connected components comprise a set of connected entities formed by following all connected edges within the set of connected components;
   utilizing a first cloud computing cluster within the cloud computing environment, executing an edge profile job on the set of connected components to identify each edge that connects each entity in the set of connected components to other entities in the set of connected components, wherein such step of executing an edge profile job on the set of connected component is a map-only job;
   executing a graph building job on the cloud computing cluster to process all edges from the edge profile job to build an in- memory graph data structure; and
   utilizing a second cloud computing cluster separate from the first cloud computing cluster within the cloud computing environment, traversing the in-memory graph data structure to find bridge edges in the in-memory graph data structure as a map-only job, wherein a bridge edge is one of the edges that is the only edge connecting two connected subcomponents.

2. The method of claim 1, wherein the set of connected components comprises delimited nodes keyed by a group identifier.

3. The method of claim 2, wherein the set of connected components do not connect via all edges.

4. The method of claim 1, wherein the step of executing an edge profile job utilizes a first data store comprising an edge type key for each edge.

5. The method of claim 4, wherein the step of executing an edge profile job further utilizes a second data store comprising a matched edge value and a corresponding set of one or more entity identifiers.

6. The method of claim 5, wherein the step of executing an edge profile job further comprises the step of, for each entity processed within a set of prospecting groups, looking up each edge value in the data graph by type.

7. The method of claim 6, further comprising the step of outputting a plurality of edge profiles.

8. The method of claim 7, wherein the plurality of edge profiles are in nested delimited format and broken up by edge type, then by edge value, and then edge identifier.

9. The method of claim 8, wherein the step of executing a graph building job further comprises the step of examining each edge to build an edge type and value to entity identifier data store comprising an edge type and edge value to entity identifier matching.

10. The method of claim 9, wherein the step of executing a graph building job further comprises the step of building an entity identifier to edge type and value data store comprising an entity identifier to edge type and value matching.

11. The method of claim 10, wherein the step of executing a graph building job further comprises the step of processing through the entity identifier to edge type and value data store and looking up each value list by entity identifier in the edge type and value to entity identifier data store.

12. The method of claim 11, wherein a resulting set of entity identifier pairs is ordered deterministically and stored in the entity identifier to edge type and value store to avoid duplicate edges.

13. The method of claim 12, wherein the step of traversing the graph to find bridges comprises the step of performing a breadth first search.

14. The method of claim 13, wherein the step of traversing the graph to find bridges further comprises the step of generating a list of entity identifiers seen during the breadth first search.

15. The method of claim 14, wherein the step of traversing the graph to find bridges further comprises the step of comparing the list of seen entity identifiers to a complete list of entity identifiers to identify entities associated with a bridge.

* * * * *